Figure 1:
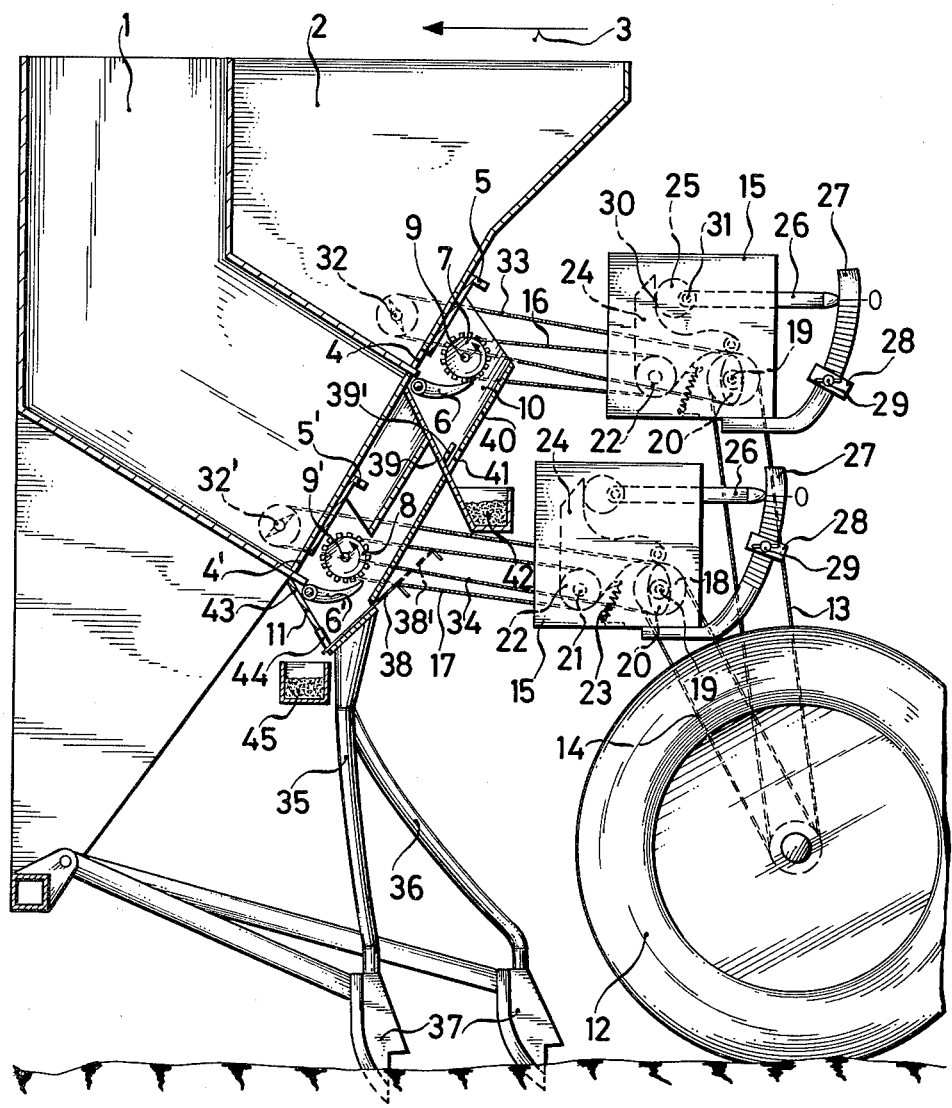

United States Patent [19]

Dreyer

[11] 4,263,858
[45] Apr. 28, 1981

[54] SEED AND FERTILIZER DRILL DRIVE

[75] Inventor: Heinz Dreyer, Hasbergen-Gaste, Fed. Rep. of Germany

[73] Assignee: Amazonen Werke, Hasbergen-Gaste, Fed. Rep. of Germany

[21] Appl. No.: 9,983

[22] Filed: Feb. 6, 1979

[30] Foreign Application Priority Data

Feb. 6, 1978 [DE] Fed. Rep. of Germany ....... 2804959

[51] Int. Cl.³ ............................................. A01C 7/06
[52] U.S. Cl. ..................................... 111/73; 111/77; 111/78; 111/80; 222/615; 222/619; 222/624
[58] Field of Search ........................ 111/73, 80, 34, 77, 111/78; 222/614, 615, 616, 618, 619, 620, 623, 624, 625

[56] References Cited

U.S. PATENT DOCUMENTS

| 2,541,867 | 2/1951 | Givenrod ........................ 222/625 X |
| 2,684,785 | 7/1954 | Waldorf et al. ................. 222/624 X |

FOREIGN PATENT DOCUMENTS

| 709611 | 5/1965 | Canada ..................................... 111/73 |
| 881280 | 9/1971 | Canada . | |
| 837022 | 3/1952 | Fed. Rep. of Germany . | |
| 2036760 | 1/1972 | Fed. Rep. of Germany . | |
| 1906077 | 4/1972 | Fed. Rep. of Germany . | |
| 2238328 | 9/1975 | Fed. Rep. of Germany . | |
| 2508464 | 9/1976 | Fed. Rep. of Germany . | |
| 2521619 | 10/1976 | Fed. Rep. of Germany . | |
| 2555011 | 6/1977 | Fed. Rep. of Germany ............. 111/34 |
| 434164 | 1/1912 | France ....................................... 111/77 |
| 622732 | 6/1927 | France ..................................... 222/620 |
| 717065 | 12/1931 | France ..................................... 222/614 |
| 14346 | of 1915 | United Kingdom ...................... 111/80 |

Primary Examiner—Steven A. Bratlie
Attorney, Agent, or Firm—Sprung, Felfe, Horn, Lynch & Kramer

[57] ABSTRACT

A machine (FIG. 1) for dispensing seed and fertilizers, which is equipped with two hoppers one for the seed, and the other for the fertilizer. The materials flowing from outlet apertures of the hoppers while the machine is in operation are introduced into the soil in controlled amounts through proportioning means, chutes and tubes which discharge into hoes. The proportioning means have a plurality of feed wheels disposed on shafts and are driven by a ground-dependent power source.

13 Claims, 4 Drawing Figures

U.S. Patent  Apr. 28, 1981  Sheet 1 of 3  4,263,858

SEED AND FERTILIZER DRILL DRIVE

The invention relates to a machine for dispensing seed and fertilizers, which is equipped with at least two hoppers, and in which the materials flowing from the outlet apertures of these hoppers while the machine is in operation are introduced into the soil in controllable amounts through a proportioning means, chutes and tubes discharging into hoes, the proportioning means having a plurality of feed wheels disposed on shafts and driven by a ground-dependent power source.

A machine of this kind is known through Canadian Pat. No. 881,820. In this machine, the feed wheels disposed on the shafts are displaceable according to the so-called shifting wheel system with respect to the chutes attached in equal number to the outlet apertures, the output rate of flow being determined by the length of the engagement of the feed wheels into the chutes. In order to be able to feed different types of materials to the soil in the desired amounts, the feed wheels are disposed so as to be removable with their shafts and replaceable by feed wheels having larger or smaller cogs on their circumferential surface.

This results, however, in the disadvantage that, in order to change the machine over to a type of material whose fineness differs greatly from that of the material previously spread, a considerable expenditure of time and effort is required. It is furthermore especially disadvantageous that, with this shifting wheel system, the output rate that is desired in each case cannot be set with the necessary precision. Furthermore, due to the absence of an agitator means in the hoppers, it is impossible to prevent disturbances or interruptions of the feed due to bridging within the hoppers in the case of seeds having long awns or of caking types of fertilizers. Furthermore, it is disadvantageous in this machine that the so-called run-off procedure required for the purpose of establishing the length to which the feed wheels must engage in the chutes for a particular actual rate of output involves considerable difficulty. This is because the tubes have to be removed individually from the chutes and put back on again at the end of the run-off procedure, and secured in place by means of a resilient ring on each.

Furthermore, German Offenlegungsschrift No. 25 08 464 discloses a machine for the pneumatic dispensing of seed and fertilizers, in which the materials are distributed on the surface of the ground by means of tubes connected to a blower. In this machine the feed wheels of the proportioning means are driven through a regulable freewheel drive, the rates of discharge being determined by the rotatory speed of the feed wheels. A cam operated mechanism is provided for the adjustment of the rotatory speed of the output shaft of each freewheel drive, it being possible by means of the cam wheel mechanism to reduce the rotation of the output shaft to a full stop.

This machine is characterized by a precise adjustment of the rates of output. It is disadvantageous, however, that the run-off procedure for determining this precise adjustment to the actual rate of output corresponding to the desired rate of output again requires a relatively great expenditure of time and effort, because for this purpose the machine must be driven over a measured distance and the grains of material blown out of the discharge apertures of the tubes must be caught in air-permeable bags. Furthermore, it has been found disadvantageous in this machine that always only one kind of material can be dispensed, that powdered fertilizers cannot be dispensed at all, and that in the case of caking types of material bridging can occur within the hoppers, which then result in irregularities in the distribution of the materials on the ground.

Through German Auslegeschrift No. 25 21 619 another machine has become known for the pneumatic dispensing of seed and fertilizers. As in the case of the known machine first described, two hoppers are provided, so that two types of material can be dispensed simultaneously at separately adjustable rates. Here the feed wheels of the proportioning means are combined in sets and are driven through a controlled-speed transmission at adjustable rotatory speeds. Furthermore, the guide means have movable deflecting elements which can be arrested in two positions, the materials being fed by the proportioning means being fed into the tubes in the one position and discharged to the exterior in the other position.

This machine is again characterized by a precise adjustability of the rates of output. The deflecting elements offer also the advantage that the run-off procedure for determining the precise adjustment of the proportioning means to the actual output rates can be performed conveniently and in short period of time, since for this purpose the deflecting elements need only to be arrested in the position in which they deflect the materials to the exterior where they can be caught in containers for weighing. In like manner, it becomes easy to clear out any residual materials remaining in the hoppers after each use of the machine.

The disadvantage of this machine is again that fertilizers in powder form cannot be dispensed at all, and that frequently disturbances cannot be avoided in the dispensing of caking types of fertilizers.

Lastly, a machine for the dispensing of seed has become known through German Offenlegungsschrift No. 20 36 760. In this machine a separately driving agitator means is provided in the hopper. This results in the advantage that seeds having long awns or which have become slightly moist can be introduced with sufficient uniformity into the soil through the tubes and hoes connected to the proportioning means.

It is disadvantageous in this machine that only one type of material can be dispensed, unless several materials are mixed in the hopper. Even if this is done, however, individual adjustment of the rate of output for each type of material is not possible. Moreover, the disadvantage exists in this case that the residual amounts of material in the hopper after use, if they are a mixture of seed and fertilizers, cannot be used again in the case of a later additional use and hence they are wasted.

Also, in the run-off procedure, the amounts of material fed by the proportioning means must be caught individually at the hoes. Aside from the complications which this involves, the run-off procedure can threfore be performed only with the machine on a stand, in which case there is no allowance made for the differences resulting from the differing slippage of the ground wheel driving the proportioning means depending on the nature and state of the soil in the amount of material actually put out during the use of the machine.

Finally, the driving means for the feed wheels must have a special clutch in order to prevent the seeds in the hopper from falling onto the soil through the tubes and the hoes and then being lost when turning about at the ends of the fields or during transportation.

Now, the object of the invention is to improve the machine described in the beginning, such that a perfect, uniform dispensing of the materials at dispensing rates precisely adjustable for each type of material will be achieved, as well as a simple and rapid run-off and a simple and rapid emptying out of the residual amounts of materials remaining in the hopper after use.

This object is achieved in accordance with the invention by the combination of the following features, which are known in themselves individually or in groups:

a—the rates of output are determined by the rotatory speed of the feed wheels, b—the driving of the feed wheels of each proportioning means is accomplished by a conrollable freewheel drive.

c—a cam wheel mechanism is provided for the setting of the rotatory speed of the output shaft of each freewheel drive, d—by means of the cam wheel mechanism the rotation of the output shaft of each freewheel drive can be switched to a standstill, e—the chutes have movable deflector elements, f—the deflector elements are arrestable in two positions, the materials fed by the proportioning means being guided into the tubes in the one position and discharged externally in the other position, and g—a separately driven agitator means is provided in each hopper.

Here it is of secondary importance whether the machine is equipped with the known drag or disk hoes or with moldboard shares as in the case of a so-called disker. For turning about at the ends of the field or for transport, the cam wheel mechanism of each freewheel drive is simply adjusted so that the output shafts of the freewheel drive stop turning. A special clutch, therefore, is not necessary. For the run-off, again, only the deflector elements need to be moved to the position in which the materials are guided to the exterior.

It is advantageous in this case to provide one collecting trough each outside of the chutes connected to the two proportioning means in the manner known in itself through German Auslegeschrift No. 2521619. By this measure the machine can be run-off in a single procedure for both types of materials for the purpose of its precise adjustment to the actual output rates. Also, in this manner, the calibration can be performed either with the machine on a stand or by driving the machine over a measured course.

The invention furthermore provides that, in a manner known through German Pat. No. 2238328, the excentric wheel mechanism of each freewheel drive is equipped with at least one oval cam wheel fastened on its input shaft, that each freewheel drive has at least one freewheel to which there is attached a lever arm which can be urged resiliently against the oval cam wheel by means of a spring, and that for the adjustment of the contact travel of the lever arm on the oval cam and hence of its stroke, an additional cam is rotatably mounted in each freewheel drive and is connected to an adjusting lever reaching to an adjustment scale. This construction is characterized especially by great simplicity and precise adjustability of the rotatory speed of the feed wheels to the actual rates of output desired in each case. If in this case a stop which is continuously adjustable over the range of the adjustment scale is provided for each adjusting lever, then, after each turnabout at the ends of a field, it will be possible in a very simple manner to reset precisely the rotatory speeds of the proportioning means which were determined by the run-off procedure, without the possibility of the development of variations in the rates of output.

In a preferred embodiment of the invention, one freewheel drive has on its input shaft three oval cams disposed offset at equal angles from one another, and on its output shaft three freewheels disposed side by side. In this manner an especially balanced, uniform operation of the free-wheel drive and feed wheels transmissively connected thereto is advantageously achieved. This advantage can be obtained for all feed wheels, i.e., both for the dispensing of seed and for the dispensing of fertilizers, if both of the freewheel drives have oval cam wheels disposed offset by the same angle from one another on their input shaft and three freewheels disposed side by side on their output shaft.

If the driving of each agitator means takes place from the input shaft of each freewheel drive, the result will be, on the one hand, a substantially simpler drive mechanism than in the machine of German Offenlegungsschrift No. 20 36 760, and on the other hand it is necessary in the design of the freewheel drives to provide only for the substantially lower output power than is required by the feed wheels.

Provision is furthermore made in accordance with the invention for the feed wheels to be equipped with cogs on their circumference in a manner known in itself through German Pat. No. 19 06 077, the outer flanks of the cogs at the sidewalls of the chutes enclosing them on both sides, forming an outwardly directed angle. As a result of these measures, materials which have an especially sensitive granulation can be dispensed perfectly without the danger that these grains might be damaged much less ground between the feed wheels and the sidewalls of the chutes.

In an additional advantageous embodiment of the invention, each feed wheel at least of the proportioning means intended for seeds has the combination known through German Pat. No. 837022 of a regular seed wheel provided with cogs and a fine seed wheel equipped with small teeth, each regular seed wheel being disposed rotatably and each fine seed wheel co-rotationally on the shaft of the proportioning means, and the fine seed wheel being able to be coupled with the regular seed wheel by means of a coupling element which can be arrested in either of two working positions, the coupling element being engaged both in the regular seed wheel and in the fine seed wheel in the one working position, and in the other working position being engaged only in the regular seed wheel and at the same time being held in one sidewall of the corresponding chute. These measures permit, in an optimum manner, a precise and uniform dispensation of the different types of seeds with uniformly constructed feed wheels, without the need to install special feed wheels for the so-called fine seed types. If all feed wheels, in accordance with the invention, have the combination, known in itself, of one regular seed wheel and one fine seed wheel, the advantage described above will be achieved for all types of materials, especially microgranular products which are to be fed into the soil in very small amounts.

Figure 2:
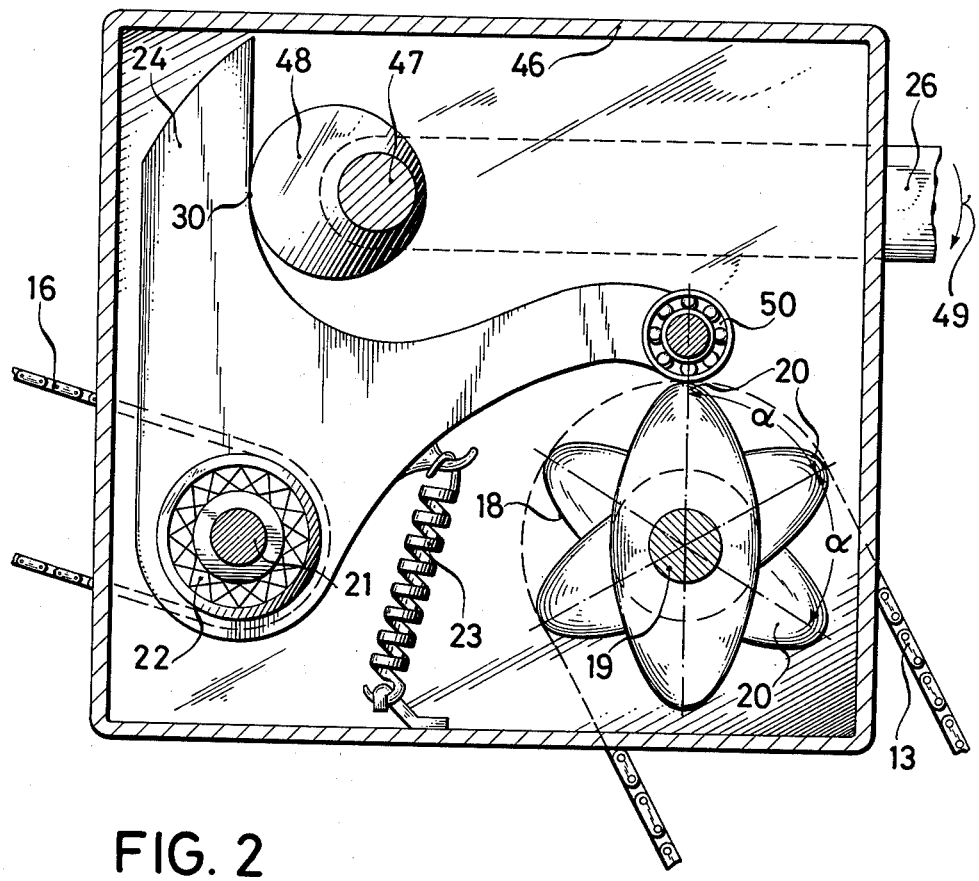
Figure 3:
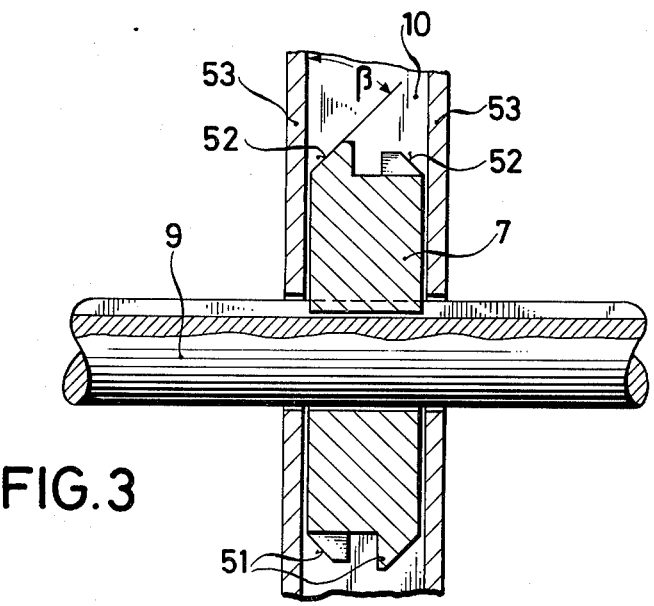
Figure 4:
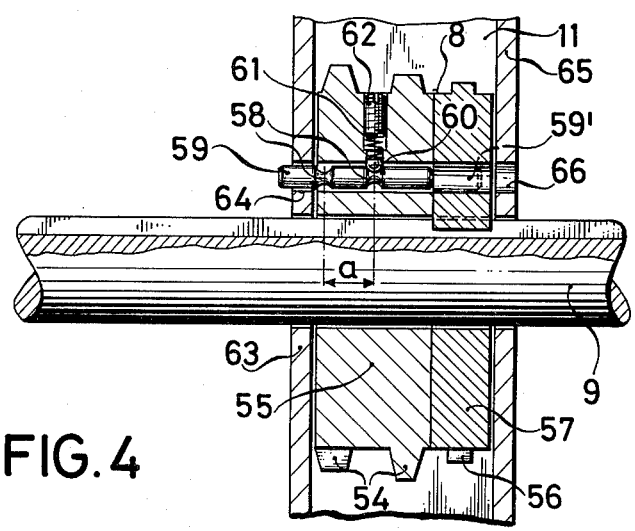

The invention will be further explained below with the aid of the appended drawings. In them, FIG. 1 shows a machine in accordance with the invention and having a freewheel drive, in a diagrammatically represented side view, FIG. 2 shows another freewheel drive of the same machine on an enlarged scale and in longitudinal cross section, FIG. 3 shows a feed wheel of the proportioning means intended for fertilizers, also on an enlarged scale and in cross section, and FIG. 4 shows a feed wheel of the proportioning means intended for seeds, on the same scale and likewise in cross section.

The machine is equipped with the hopper 1 for the seeds and with the hopper 2 for the fertilizers, a plurality of outlet apertures 4 and 4' being disposed in both of the hoppers 1 and 2 transversely of the direction of machine travel indicated by the arrow 3. These outlet apertures can be closed and adjusted to different sizes by means of the shutters 5 and 5'. Furthermore, externally of the hoppers 1 and 2, there are provided two proportioning means 6 and 6', the upper of which has a feed wheel 7 in front of each outlet aperture 4, and the lower of which has a feed wheel 8 in front of each outlet aperture 4'. These feed wheels 7 and 8 are mounted on the shafts 9 and 9' which are rotatably mounted on the hoppers 1 and 2, the upper feed wheels 7 being partially surrounded by the chutes 10. The shafts 9 and 9', and with them the feed wheels 7 and 8, are driven by the right wheel 12 of the drill through the chains 13 and 14, the two freewheel drives 15 and the chains 16 and 17.

Within each freewheel drive 15 is the cam wheel mechanism 18 which has the oval cam wheel 20 fastened to the input shaft 19. On the output shaft 21 there is disposed the freewheel 22 on which there is situated a lever arm 24 which can be urged resiliently, by means of the spring 23, against the oval cam wheel. Above the freewheel 22 there is also provided a self-locking rotatably mounted cam 25 as an abutment for the lever arm 24. This cam 25 is equipped with an adjusting lever 26 which extends as far as the adjusting scale 27. The stop 28 is continuously adjustable on the setting scale 27 and can be locked in place by means of the wing bolt 29.

In the situation represented in FIG. 1, the adjusting levers 26 are at the zero position. In this position the cams 25 at the contact points 30 of the lever arms 24 on the cam periphery are at the greatest distance from the pivot pins 31 of the cams 25. The ends of lever arms 24 which can be urged against the oval cam wheels 20 are thus lifted up to such an extent that they no longer come in contact with the oval cams 20 and the output shafts 21 of the freewheel drives 15 and therefore the feed wheels 7 and 8 will remain stopped even though the ground wheel 12 is rotating.

Within the hoppers 1 and 2 the agitator means 32 and 32' are rotatably mounted, which are also driven by the right running wheel 12 of the machine through the chain drive 33 and 34, respectively.

While the machine is in operation, the seed in hopper 1 is introduced into the soil at a rate corresponding to the rotatory speed of the feed wheels 8, through the chute 11, the tubes 35 and 36 attached thereto, and the hoes 37 disposed alternately in two rows, one behind the other. The fertilizer, which is in hopper 2, passes at the rate determined by the rotary speed of the feed wheels 7, into the chute 10 from which it drops into the chute 11 and also through tubes 35 and 36 and hoes 37 into the ground.

To facilitate the run-off procedure, there is provided beneath each chute 11 a shutter-like deflector means 38, while in the bottom portion of each chute 10 there is pivotingly disposed a deflector means 39. One outlet aperture 41 is provided in each of the outer walls 40 of the chute 10.

In FIG. 1, the deflector means 38 and 39 are shown in the run-off position. In this position, the fertilizer fed by the feed wheels 7 into the chute 10 runs through the outlet apertures 41 into the trough 42 disposed externally of the deflector means 39. The seed fed by the feed wheels 8 into the chute 11, however, passes through the discharge apertures 44 disposed in the outer walls 43 of the chute 11 into the trough 45. While the machine is in operation, the deflector means 38 and 39 will then be in the positions 38' and 39' represented in broken lines.

The freewheel drive 46 represented in FIG. 2 differs from the freewheel drive 15 in that the cam mechanism 18 has three oval cam wheels 20 of identical configuration which are fastened on the input shaft 19 each at an angle α of 60° from one another. Additionally, three freewheels 22 are disposed side by side on the output shaft 21, each of them being equipped with a lever 24 which is urged by means of a spring 23 in the direction of the oval cam wheel 20. Above the freewheels 22 the cam 48 extending across all of the lever arms 24 is rotatably mounted on the shaft 47 and is connected to the adjusting lever 26.

In this figure the cam 48 is represented in a position wherein the points of contact 30 of the lever arms 24 are situated at the greatest possible distance from the shaft 47. Now, if the adjusting lever is depressed in the direction of the arrow 49, the distance between contact point 30 on lever arms 24 and the shaft 47 will diminish. In this manner the ball bearings 50 disposed at the other end of the lever arms 24 can ride over a corresponding distance on the surface of the oval cam wheels 20, so that the lever arms 24 will perform the rocking movement established by the cam 48, and upon each revolution of the input shaft 19 the output shaft 21 will advance thrice by an amount corresponding to the rocking movement of a single lever arm 24.

The feed wheel 7 represented in FIG. 3 co-rotationally disposed on shaft 9 is equipped on its periphery with cogs 51 disposed in two rows and offset from one another. The outer side surfaces 52 form an outwardly directed angle β with the sidewalls 53 of the chutes 10 enclosing them on both sides.

On the other hand, the feed wheel 8 represented in FIG. 4 consists of the regular seed wheel 55 provided with the cogs 54 and the fine seed wheel 57 equipped with the small teeth 56. Here the regular seed wheel 55 is disposed rotatably, the fine seed wheel 57 co-rotationally, on the shaft 9. Within the regular seed wheel 55, the coupling element 59, provided with two circumferential grooves 58 situated at a distance a from one another, is displaceably disposed. For the arresting of this coupling element 59, a ball 60 is provided, which is urged by the spring 61 against the coupling element 59 and is held with spring 61 in the regular seed wheel 55 by means of the screw 62.

As a result of this arrangement, the coupling element 59 can be shifted to two working positions. In the working position represented in FIG. 4, the left, outside portion of the coupling element 59 is engaged in the bore 64 disposed in the left sidewall 63 of the chute 11 enclosing the feed wheel 8 on both sides. In this working position only the fine seed wheel 57 is driven by the shaft 9, and then feeds especially fine seed types at the correspondingly small amounts into the chute 11.

In the other working position 59', represented in broken lines, the coupling element 59 is disengaged from the bore 64 and is then in engagement with the regular seed wheel 55 and the fine seed wheel 57. In this working position 59', both the fine seed wheel 57 and the regular seed wheel 55 are driven by shaft 9 and feed the seed into the chute 11.

To enable the coupling element 59 to be forced from working position 59' back into the other working position, the access bore 66 is provided in the right sidewall 65 in alignment with bore 64.

Lastly, it is to be noted that all of the feed wheels 7 and 8 can be made either as represented in FIG. 3 or as represented in FIG. 4.

I claim:

1. A machine for dispensing seed and fertilizer comprising two hoppers each having outlet apertures for discharge of materials therefrom, conduit means for receiving the materials from the apertures and conveying it to the ground for deposit therein, a metering means for each aperture for control of the dispensing rate of the materials into the soil, means for precisely adjusting the dispensing rate by the metering means whereby the dispensing rate can be adjusted continuously over a range, each metering means comprising a rotatable feed wheel for control of said dispensing rate by the rotatory speed thereof, a regulatable freewheel drive for each of the feed wheels for the driving thereof, each free wheel drive having an output shaft connected to its feed wheel for the driving thereof, a cam wheel mechanism for control of the rotatory movement of said output shaft, and cam means for disengaging the cam wheel mechanism and the output shaft, a ground-dependent power source for driving each cam wheel mechanism, and deflector means arrestable in two positions, one for the guiding of materials issuing from the apertures into the conduit means, the other for diverting these materials from the conduit means, and an agitator means in each hopper and means for driving each agitator means independently of the driving of the feed wheels.

2. Machine of claim 1, and gathering troughs disposed for receiving materials diverted from the conduit means by the deflector means.

3. Machine of claim 1, the cam wheel mechanism of each freewheel drive comprising in a manner known in itself, at least one oval cam wheel which is mounted for being driven by said power source, each freewheel drive having at least one freewheel, a lever arm connected to each freewheel, and means resiliently urging the lever arm toward the oval cam wheel for driving of the lever arm by the oval cam wheel, the cam means of each freewheel drive being for the adjustment of the freedom of movement of the lever arm in relation to the oval cam wheel and an adjusting lever and adjustment scale for adjustment of the cam means for varying said freedom of movement.

4. Machine of claim 3, and a stop for the adjusting lever, the lever being continuously adjustable over the range of the adjustment scale for said adjustment continuously over a range.

5. Machine of claims 3 or 4, comprising a freewheel drive having three oval cam wheels offset from one another by the same angle, and a freewheel for each of said three oval cam wheels.

6. Machine of claims 2 or 4, comprising a freewheel drive for each of said two hoppers, and each of the two freewheel drives having three oval cam wheels offset from one another by the same angle, and a freewheel for each of said three oval cams.

7. Machine of claim 1, 2, 3, or 4, each ground-dependent power source comprising an input shaft for each free-wheel drive, and connecting means for each agitator for driving the agitator by the input shaft for the freewheel drive for the hopper in which the agitator is disposed.

8. Machine of claim 5, each ground-dependent power source comprising an input shaft for each free-wheel drive, and connecting means for each agitator for driving the agitator by the input shaft for the freewheel drive for the hopper in which the agitator is disposed.

9. Machine of claim 6, each ground-dependent power source comprising an input shaft for each free-wheel drive, and connecting means for each agitator for driving the agitator by the input shaft for the freewheel drive for the hopper in which the agitator is disposed.

10. Machine of claims 1, 2, 3, or 4, wherein the conduit means comprises chutes, the feed wheels being disposed in the chutes, the chutes having side walls adjacent and parallel to the sides of the feed wheels, each feed wheel having on its periphery cogs having outer side surfaces forming with the side-walls of the chutes on both sides an outwardly directed angle.

11. Machine of claim 1, 2, 3, or 4, wherein the conduit means comprises chutes, the feed wheel(s) of one of the hoppers being mounted on shaft(s) and each of the last mentioned feed wheel(s) being disposed in a chute having sidewalls parallel to the feed wheels, and comprising the combination, known in itself, of a regular seed wheel provided with cogs and a fine seed wheel equipped with small teeth, each regular seed wheel being disposed rotatably and each fine seed wheel co-rotationally on the feed wheel shaft, the fine seed wheel being connectable with the regular seed wheel by means of a coupling element which can be arrested in two positions, the coupling element engaging both the regular seed wheel and the fine seed wheel in the one position and engaging only the regular seed wheel in the other position while being held at the same time to one sidewall of the corresponding chute.

12. Machine of claim 10, the feed wheel(s) of one of the hoppers being mounted on shaft(s) and each of the last mentioned feed wheel(s) being disposed in a chute having sidewalls parallel to the feed wheel(s), and comprising the combination, known in itself, of a regular seed wheel provided with cogs and a fine seed wheel equipped with small teeth, each regular seed wheel being disposed rotatably and each fine seed wheel co-rotationally on the feed wheel shaft, the fine seed wheel being connectable with the regular seed wheel by means of a coupling element which can be arrested in two positions, the coupling element engaging both the regular seed wheel and the fine seed wheel in the one position and engaging only the regular seed wheel in the other position while being held at the same time to one sidewall of the corresponding chute.

13. Machine of claim 7, wherein each feed wheel has the combination, known in itself, of one regular seed wheel and one fine seed wheel.

* * * * *